Nov. 12, 1963     L. AXTHAMMER     3,110,485

HYDRO-PNEUMATIC SUSPENSION DEVICE

Filed March 13, 1962

INVENTOR

Ludwig Axthammer

By Richard Ernst

Agt

United States Patent Office 3,110,485
Patented Nov. 12, 1963

3,110,485
HYDRO-PNEUMATIC SUSPENSION DEVICE
Ludwig Axthammer, Schweinfurt (Main), Germany, assignor to Fichtel & Sachs A.G., Schweinfurt (Main), Germany, a corporation of Germany
Filed Mar. 13, 1962, Ser. No. 179,350
Claims priority, application Germany Mar. 15, 1961
12 Claims. (Cl. 267—64)

This invention relates to suspensions of the type used in automotive vehicles for suspending sprung portions of a vehicle on a supporting unsprung structure, and more particularly to a self-leveling hydro-pneumatic suspension device.

In known devices of this type, the functions of the usual springs are performed by a cushion of gas under relatively high pressure acting on hydraulic fluid contained between a cylinder and piston which are respectively attached to the sprung and unsprung masses of the vehicle. The functions of a conventional shock absorber are performed by perforate walls having throttling passages through which the hydraulic fluid passes back and forth during the relative oscillating movement of the piston and cylinder. The self-leveling feature of the known suspension devices makes use of pumps which are actuated by the relative movement of the piston and cylinder, and are controlled by the relative position of these two suspension members.

The known hydro-pneumatic suspension devices are relatively complex. They are therefore rather costly to manufacture, and require careful maintenance for proper functioning. Some known suspension types require ducts outside the relatively sturdy piston and cylinder, and are vulnerable to mechanical damage for this reason.

One of the important objects of this invention is the provision of a hydro-pneumatic device of the general character outlined above having individual elements of particularly simple shape, and capable of being assembled in a very simple manner so as to reduce the first cost of the apparatus.

Another object is to provide a hydro-pneumatic suspension device which is sturdy, composed of a minimum of parts, and therefore inherently reliable in operation and easy to maintain.

Figure 1:
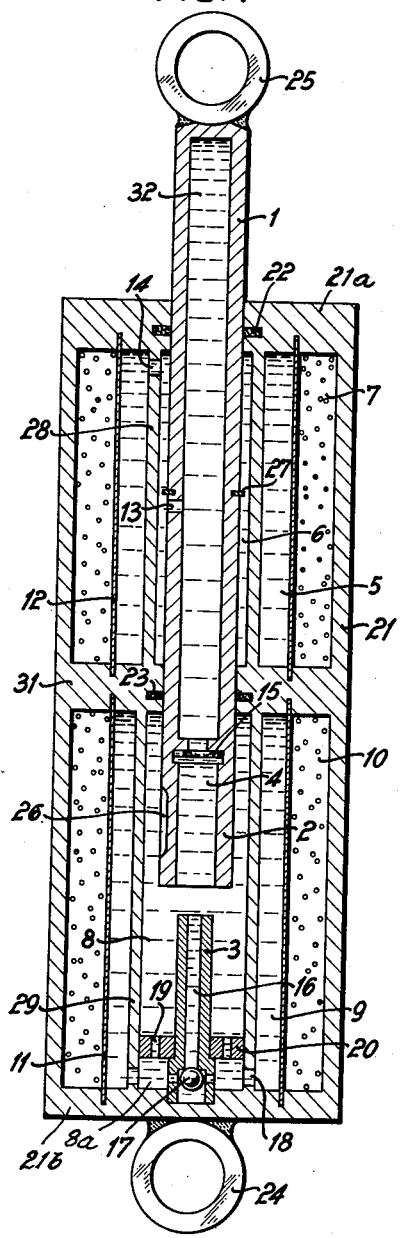
Figure 2:
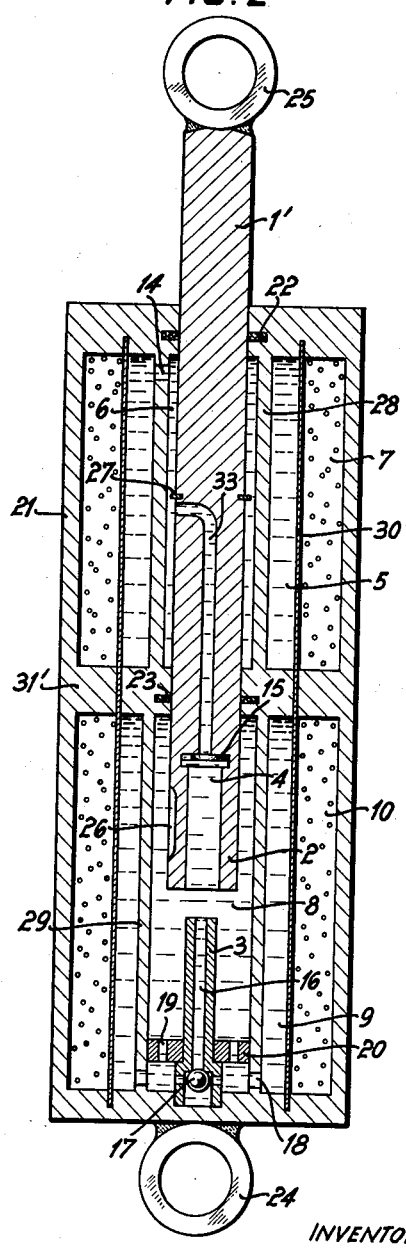

Other objects and many of the attendant advantages of this invention will be readily appreciated from the following detailed description of preferred embodiments thereof, when taken in conjunction with the annexed drawing, in which:

FIG. 1 shows a hydro-pneumatic suspension device of the invention in axially sectional elevation; and FIG. 2 shows a modification of the device of FIG. 1 in a corresponding view.

Referring now to the drawing, and initially to FIG. 1, there is seen a suspension device having an outward appearance substantially similar to that of a conventional automotive shock absorber. The elements of the apparatus visible from the outside are a cylindrical shell 21 and a coaxial cylindrical plunger 1. Respective annular fastening members 24, 25 are attached to the axial end portion of the plunger outside the shell 21, and to the bottom 21b of the shell 21 which closes the axial end of the shell remote from the plunger 1. The plunger passes through an annular cover 21a which closes the top end of the shell 21 as viewed in the drawing.

While the plunger 1 is being referred to in the specification as projecting from the top of the shell 21, it will be appreciated that the device is not limited in its use to any particular orientation in space, and that the position shown in the drawing and described in the specification is merely illustrative.

In a typical application of the suspension device of the invention, the annular fastening members 24, 25 may be attached to the frame and an axle of an automotive vehicle to suspend the frame on the supporting axle, but many other fields of application will readily suggest themselves to those skilled in the art.

Referring now to the internal structure of the suspension device as shown in axial section in FIG. 1, the shell 21 is seen to be hollow. Its cavity is axially divided by a transverse partition 31 into two spaces. The cavity space above the partition 31, as viewed in FIG. 1, will be referred to hereinafter as the "storage space," whereas the remainder of the cavity below the partition 31 will be referred to as "pressure space" for reasons which will become presently apparent.

The plunger 1 is arranged in such a manner that its free end portion 2 in the cavity of the shell 21 is at all times within the pressure space, and a central or intermediate portion passes axially through the partition 31 and through the storage space. Sealing engagement between the plunger 1 and the partition 31 is assured by a packing 23, and a similar packing 22 in the cover 21a prevents escape of fluid from the storage space along the outer surface of the plunger 1 which is of substantially uniform cylindrical shape over its entire length.

The plunger is hollow. An axial cavity 32 extends from the closed end of the plunger outside the shell 21 over a major portion of the plunger length. The inner end portion 2 of the plunger has an axially open bore 4 which constitutes the cylinder space of a pump which will be discussed in more detail hereinafter. A one-way valve or check valve 15 is arranged in the bore 4 at the orifice of a short passage which connects the cavity 32 with the bore 4. The valve 15 opens only when the pressure in the cavity 32 is higher than that in the bore 4. The valve 15 is a plate valve of known construction.

A plurality of radial bores or passages 13 of which only one is shown connects the cavity 32 with the surrounding storage space. An annular abutment 27 on the plunger 1 axially engages the cover 21a of the shell during outward movement of the plunger, and prevents the passage 13 from losing communication with the storage space during outward movement of the plunger. The stroke of the plunger in the inward direction is limited by abutment of the end portion 2 against elements fixed to the shell 21 in such a manner that the stroke of the plunger is substantially shorter than the axial length of the storage space. The orifice of the bore 13 thus communicates with the storage space at all times.

An axially elongated open groove 26 is formed in the cylindrical outer surface of the plunger 1 near its inner end portion 2. The two open axially spaced terminal portions of the groove 26 are normally both within the pressure space in the shell 21. The spacing of these terminal portions is greater than the axial thickness of the partition 31, and the groove is located on the plunger in such a manner that the groove 26 forms a passage from the pressure space to the storage space by-passing the partition before the abutment 27 engages the cover 21a during outward movement of the plunger 1 when the two terminal portions are open to the pressure space and the storage space respectively.

The storage space in the shell cavity above the partition 31 is divided into three chambers by a rigid cylindrical partition 28 and a coaxial resilient membrane 12 which is approximately cylindrical when in the relaxed condition. A chamber 6 of annular cross section is thus formed between the plunger 1 and the rigid partition 28. A chamber 5 is defined between the partition 28 and the resilient membrane 12, and a chamber 7 extends between the membrane 12 and the cylindrical wall of the shell 21. The chambers 5 and 6 are permanently connected by a plurality of radial bores 14 in the partition 28 near the cover 21a, only one bore being shown in the drawing. The chamber 7 is closed off from the remainder of the storage space by the membrane 12.

The pressure space below the partition 31 is similarly divided into coaxial chambers by a rigid partition 29 surrounding the lower end 2 of the plunger 1 and the space underneath the plunger, and by a resilient membrane 11 spacedly interposed between the partition 29 and the shell 21. The central chamber 8 is axially subdivided by a perforated circular plate 20 arranged transversely of the shell axis spacedly adjacent the bottom 21b to define with the bottom 21b a space 8a. Throttling passages 19 in the plate 20 connect the space 8a with the remainder of the central chamber 8. Radial bores 18 in the partition 29 permanently connect the space 8a with the chamber 9 intermediate the partition 29 and the membrane 11. The outermost chamber 10 is normally totally sealed between the membrane 11 and the cylindrical wall of the shell 21.

A tubular piston 3 coaxial with the plunger 1 projects from the bottom 21b into the central chamber 8 of the pressure space. It is of generally cylindrical shape and passes in sealing engagement through a conforming aperture in the plate 20. Its external diameter is almost equal to the diameter of the bore 4 in the end portion 2 of the plunger 1. Entry of the piston 3 into the bore 4 during downward movement of the plunger 1 substantially closes the cylinder space of the pump constituted by the piston 3 and the lower end 2 of the plunger, the latter providing the cooperating cylinder.

An axial bore or passage 16 in the piston 3 has an orifice in the free frontal face of the piston. Abutment of the valve 15 against this face limits the downward stroke of the plunger 1. The bore 16 leads to a check valve communicating with the space 8a and provided with a spherical valve member 17 which normally closes the bore 16 under the action of a spring (not illustrated).

The chambers 7 and 10 are filled with a gas such as air or nitrogen. The gas pressure in the chamber 7 in the storage space need not be higher than atmospheric pressure, and the chamber 7 may actually be open to the atmosphere. Gas of much higher pressure occupies the chamber 10, the gas pressure depending on the weight of the suspended structure and on the spring characteristics desired. The remainder of the shell cavity and the hollow spaces within the plunger 1 are substantially filled with liquid, conventional hydraulic fluid being preferred.

The apparatus described with reference to FIG. 1 of the drawing operates as follows:

In the normal position of the plunger 1 shown in FIG. 1, the piston 3 is outside the bore 4, and both terminal portions of the groove 26 are within the central chamber 8. Cyclic changes occur in the compressive force exerted by the connected structures on the fastening members 24, 25 while a vehicle equipped with the suspension moves over a road. Increased pressure drives the plunger slightly deeper into the central chamber 8 and displaces liquid through the throttling passages 19 in the plate 20 and the bores 18 in the partition 29 into the chamber 9, thereby deforming the membrane 11 and further compressing the resilient gas cushion in the chamber 10. Rebound of the compressed gas reverses the flow of fluid and drives the plunger 1 a small distance outward of the shell 21. The throttling passages 19 prevent the system from oscillating, as is well known.

If an exceptionally heavy load drives the plunger inward of the shell 21 beyond its normal position, or normal range of positions, the piston 3 engages the cylinder formed by the inner end portion 2 of the plunger 1. Further inward movement of the plunger 1 during travel compresses the liquid within the pump space 4 until the one-way valve 17 opens and the liquid from the pump space is partly discharged into the pressure space chamber 8, and contributes to the compression of the gas in the chamber 10. When the plunger 1 rebounds while maintaining engagement of the piston 3 in the pump space 4, the valve 17 closes, the pressure within the pump space drops, and the valve 15 opens to admit additional liquid to the pump space 4. This liquid is discharged into the pressure space during the subsequent inward movement of the plunger 1.

The normal relative movement of the sprung and unsprung masses of a moving vehicle thus causes liquid to be pumped into the pressure space until the gas cushion within the chamber 10 is compressed sufficiently to balance the increased load and to disengage the piston 3 from the inner end portion 2 of the plunger 1, whereby the pump becomes ineffective. The plunger 1 is restored to its normal position.

If the load on the suspension device is lightened while the plunger is reciprocating about its normal position illustrated in FIG. 1, the resulting expansion of the gas cushion in the chamber 10 drives the plunger outward of the shell until the upper terminal portion of the groove 26 communicates with the innermost chamber 6 of the storage space. Because of the substantially lower gas pressure in the chamber 7, the gas cushion of the chamber 10 is now capable of expanding and of driving enough hydraulic liquid from the pressure space through the passage formed by the groove 26 into the storage space to permit the plunger 1 to descend to its normal position or normal range of movement.

It will be appreciated that the level of a vehicle frame is determined by the spacing of the fastening members 24, 25, and that restoration of the normal position of the plunger 1 restores the normal level of that portion of the vehicle frame which is suspended on the device illustrated. A plurality of such devices is usually interposed between the wheels and the frame of a vehicle.

A dynamic change of load caused by centrifugal forces while the vehicle rounds a curve or by any other effect of the road configuration on the moving vehicle is counteracted by the self-leveling suspension device in the same manner as the influence of a static load discussed in more detail hereinabove for the sake of illustration.

The modified suspension device illustrated in FIG. 2 differs from that seen in FIG. 1 in several structural features only. The plunger 1' is identical in external configuration with the plunger 1. Its inner end portion 2 is identical with the corresponding portion of the plunger shown in FIG. 1. A one-way valve 15 is arranged at the innermost end of the pump space 4 to selectively open responsive to low pressure in the pump space.

The remainder of the plunger 1', however, is substantially solid. The long axial cavity 32 with its communicating radial bore 13 is replaced by a channel 33 of approximately uniform cross section. The channel 33 extends from the valve 15 to an orifice in the storage space under the annular abutment 27.

The membranes 11 and 12 of the suspension device illustrated in FIG. 1 are combined into an integral membrane 30 in the apparatus shown in FIG. 2. The partition 31', of split construction to permit insertion of the unitary membrane 30, replaces the unitary partition 31. The apparatus illustrated in FIG. 2 functions in the same manner as described above in connection with FIG. 1.

The shell 21 has been illustrated conventionally as being structurally integral with the cover 21a, bottom 21b, and the partitions 31, 28, and 29. It will be appreciated that the several elements may be separate members permanently or releasably secured to each other. The apparatus illustrated may thus be assembled from elements having the shapes of cylindrical tubes of uniform diameter, and of plates bounded by circles. Such shapes are machined or otherwise prepared from metallic or non-metallic materials in a very simple manner, and lend themselves to simple assembly operations. Tight seals are readily obtained.

The plunger also is a cylindrical member of uniform external diameter which is shaped most inexpensively. It is supported and guided in the shell 21 in two fixedly spaced areas, namely in the cover 21a and in the partition 31 (or 31'). The end portion 2 freely projects into the central chamber 8. All guide and support means for the plunger are outside the chamber 8, and present circular guide openings of equal diameter.

The suspension device of the invention may be largely assembled from standard steel or brass mill shapes with a minimum of machining operations. The valves required are simple in structure, and no critical tolerances are required anywhere in the device of the invention outside the valves.

It will be understood that the apparatus illustrated and described will usually be equipped with filling valves to permit gas and liquid to be provided in the corresponding chambers, and to adjust the quantities of these fluids according to operational requirements. Such filling valves are entirely conventional in this art, and have not been shown in the drawing.

Various additional modifications are contemplated and may obviously be resorted to by those skilled in the art without departing from the spirit and scope of the invention as hereinafter defined by the appended claims, as only a preferred embodiment thereof has been disclosed.

What I claim is:

1. A hydro-pneumatic suspension device comprising, in combination:
   (a) a shell member enclosing a cavity;
   (b) a plunger member having an axis and an axial end portion located outside said shell member;
   (c) attaching means on said shell member and on said end portion of said plunger member for attaching said members to a suspended and to a supporting structure respectively;
   (d) partition means dividing said cavity into a storage space and a pressure space, said plunger member having another axial end portion in said pressure space and a portion intermediate said end portions extending substantially through said storage space, and being axially reciprocable in a direction inward and outward of said pressure space in sealing engagement with said partition means;
   (e) pump means in said pressure space including a piston member and a cylinder member defining a pump space therein, one of the two members of said pump means being constituted by said other end portion, and the other of said two pump means members being fastened to said shell member and being reciprocably engageable with said one pump means member to substantially close said pump space;
   (f) first passage means connecting said storage space and said pump space, first one-way valve means in said plunger member to control said first passage means when said two members of said pump means are engaged, said valve means being selectively responsive to a pressure in said pump space lower than the pressure in said storage space to connect said pump and storage spaces for passage of fluid therebetween;
   (g) second passage means connecting said pressure space and said pump space, second one-way valve means provided in said second passage means to be selectively responsive to a pressure in said pump space higher than the pressure in said pressure space when said two pump means members are engaged to connect said pump and pressure spaces for passage of fluid therebetween; and
   (h) resilient means in said pressure space for maintaining therein a pressure higher than atmospheric pressure.

2. A device as set forth in claim 1, wherein said plunger member is formed with a passage therein having two axially spaced open terminal portions, said plunger member normally being positioned in said shell member in such a manner that said two terminal portions communicate with said pressure space, and the members of said pump means are out of engagement, said plunger member being movable from the normal position inward of said pressure space for engagement of the members of said pump means, and outward of said pressure space until one of said terminal portions communicates with said storage space for passage of fluid between said pressure space and said storage space.

3. A device as set forth in claim 1, wherein the axial outer surface of said intermediate portion and of said other end portion of said plunger member is of substantially uniform cross section.

4. A device as set forth in claim 1, further comprising guide means on said shell member outside said pressure space cooperating with said partition means for exclusively guiding movement of said plunger member relative to said shell member.

5. A device as set forth in claim 1, wherein said cylinder member of said pump means is constituted by said other end portion of said plunger member.

6. A device as set forth in claim 5, wherein said plunger member is formed with a bore of substantially uniform cross section having orifices in said storage space and in said pump space respectively, said first valve means being arranged at one of said orifices.

7. A device as set forth in claim 5, wherein said plunger member is formed with an axially elongated bore and with two passages respectively connecting said bore to said storage space and said pump space, said first valve means being arranged in one of said passages for selectively opening and closing the same, said one of said two passages constituting said first passage means.

8. A device as set forth in claim 5, wherein said piston member extends axially from said shell member toward said plunger member and has a frontal face portion located in said pump space when the members of said pump means are engaged, said piston member being formed with a passage communicating with a portion of said pressure space and having an orifice in said frontal face portion, said second valve means being arranged to selectively close and open the last-mentioned passage, said last-mentioned passage constituting said second passage means.

9. A device as set forth in claim 8, further comprising a plate member separating said portion of said pressure space from the remainder thereof, said plate member being formed with a throttling passage therethrough.

10. A device as set forth in claim 9, wherein said plate member has an axial thickness smaller than the transverse dimensions thereof, and is formed with an axial opening therein, said axial opening being sealingly engaged by said piston member.

11. A device as set forth in claim 1, further comprising abutment means for limiting the length of stroke of the reciprocating movement of said plunger member.

12. A device as set forth in claim 11, wherein said length of stroke is smaller than the axial length of said storage space.

References Cited in the file of this patent
UNITED STATES PATENTS 2,436,573    Heynes _____ Feb. 29, 1948